United States Patent [19]

Gasper et al.

[11] Patent Number: 4,749,592

[45] Date of Patent: Jun. 7, 1988

[54] GROUTING COMPOSITION

[75] Inventors: Alton J. Gasper, Minneapolis; Charles D. Wright, Birchwood, both of Minn.

[73] Assignee: Minnesota Mining and Manufacturing Company, St. Paul, Minn.

[21] Appl. No.: 906,648

[22] Filed: Sep. 11, 1986

Related U.S. Application Data

[63] Continuation of Ser. No. 655,631, Sep. 28, 1984, abandoned.

[51] Int. Cl.$^4$ ............ C08L 53/00; C08L 33/00; C04B 16/04; C09J 3/00
[52] U.S. Cl. ............ 427/140; 523/170; 523/177; 524/505; 524/555; 524/813; 524/906; 524/915; 524/916; 525/404; 525/920; 525/921; 525/925; 525/939; 526/301; 526/302; 526/304; 526/306
[58] Field of Search ............ 523/137; 524/507, 555, 524/813, 915, 916, 906; 525/404, 920, 921, 925, 939; 526/301, 302, 304, 306; 427/140

[56] References Cited

U.S. PATENT DOCUMENTS

| | | | |
|---|---|---|---|
| 3,539,482 | 11/1970 | Stewart | 260/29.2 |
| 3,719,050 | 3/1973 | Asao et al. | 61/36 R |
| 3,732,393 | 3/1973 | Kistner | 260/77.5 |
| 3,985,688 | 10/1976 | Speech | 521/116 |
| 4,061,618 | 12/1977 | Stanley et al. | 524/591 |
| 4,069,378 | 1/1978 | DeMarco | 523/176 |
| 4,072,770 | 2/1978 | Ting | 525/920 |
| 4,180,640 | 12/1979 | Melody et al. | 526/301 |
| 4,209,604 | 6/1980 | Werber | 523/176 |
| 4,280,943 | 7/1981 | Bivens et al. | 524/906 |
| 4,287,323 | 9/1981 | Tefertiller et al. | 526/301 |
| 4,287,330 | 9/1981 | Rich | 526/301 |
| 4,295,762 | 10/1981 | Slovinsky | 405/264 |
| 4,312,605 | 1/1982 | Clarke | 405/264 |
| 4,315,703 | 2/1982 | Gasper | 524/916 |
| 4,318,835 | 3/1982 | Clarke | 264/36 |
| 4,322,327 | 3/1982 | Yoshimura et al. | 524/916 |
| 4,366,194 | 12/1982 | Pilny et al. | 427/140 |
| 4,383,079 | 5/1983 | Gasper et al. | 514/767 |
| 4,451,627 | 5/1984 | Frisch et al. | 526/307 |
| 4,507,188 | 3/1985 | Chu | 526/301 |

FOREIGN PATENT DOCUMENTS

| | | |
|---|---|---|
| 0101267 | 2/1984 | European Pat. Off. |
| 0219215 | 12/1983 | Japan ............ 526/301 |
| 1486232 | 9/1977 | United Kingdom . |

OTHER PUBLICATIONS

Kirk-Othmer, Encyclopedia of Chemical Technology, John Wiley & Sons, Third Ed., vol. 5, p. 371 (1979).

Primary Examiner—Herbert J. Lilling
Attorney, Agent, or Firm—D. M. Sell; J. A. Smith; C. Truesdale

[57] ABSTRACT

A grouting composition for sealing structures to inhibit water leakage therethrough and for stabilizing soil is provided. The composition is provided as a two-part system. Part A is an aqueous solution of a hydrophililc, water soluble prepolymer having a polyether backbone and terminal active olefinic groups, the olefinic groups being connected to the polyether backbone by linking groups selected from —NH—, —CONH—, —OCONH—, and —NHCONH—, and tertiary amine catalyst. Part B is an aqueous solution of a initiator. Parts A and B are mixed and react to form a gel.

19 Claims, 2 Drawing Sheets

GROUTING COMPOSITION

This is a continuation of application Ser. No. 655,631 filed Sept. 28, 1984, now abandoned.

BACKGROUND OF THE INVENTION

1. Field of the Invention

This invention relates to a two-part curable grouting composition and method for grouting structures and formations, such as sewer lines, to minimize or prevent water leakage through voids, joints, cracks, fissures or other openings therein. In another aspect it relates to the structures and formations so sealed.

2. Description of the Background Art

There are a host of water-bearing or holding structures, such as sewer lines, aqueducts, tunnels, wells, settling ponds, and basements of buildings, made of materials such as siliceous materials (e.g., concrete, brick and mortar), plastics (e.g., polyvinylchloride), cast iron, or wood (e.g., cypress or cedar). Because of the nature of such construction materials or the manner of constructing such structures or their locations, such structures inherently have, or develop with time, various discontinuities such as openings, cracks, fissures, joints, or the like which provide an entry or pathway for the undesirable ingress or egress of water into or from such structures. Even hairline cracks or pin-hole size openings in an otherwise sound or water-impervious structure can result in damaging and costly leakage from a temporary or permanent water source.

Water-holding structures, such as concrete irrigation water courses, aqueducts, earthen dams, or dikes, bearing a static head or flowing stream of water, also experience leakage due to holes, cracks, fissures, and the like, such leakage being an uneconomical loss of water as well as hazardous in many circumstances.

A host of grouting compositions and sealing techniques have been used to prevent the ingress or egress of water into or from such structures.

Curable polyurethane compositions containing isocyanate-terminated prepolymers based on polyols have been disclosed as grouting compositions and sealing agents for sewers and similar uses (see U.S. Pat. No. 3,985,688, Canadian Pat. No. 1,035,521 and British Patent Specification No. 1,486,232). Latex reinforced curable polyurethane compositions comprising isocyanate-terminated prepolymers based on polyols have also been disclosed for such uses (see U.S. Pat. No. 4,315,703). Also known is the use of curable isocyanate prepolymers with water to consolidate soil (see U.S. Pat. No. 3,719,050). These prior isocyanate-terminated prepolymer compositions frequently have limited utility, however, because of one or more reasons. Some may cure to form a tough, highly cohesive mass making it difficult to remove contacting equipment after curing. Others may undergo dramatic volume fluctuations with changing environmental conditions, such as changes in moisture conditions. Such volume changes make it difficult to maintain an adequate seal of, for example, a leaking sewer line.

Curable monomer compositions comprising aqueous solutions of magnesium diacrylate and alkali metal monoacrylate or hydroxyalkyl monoacrylate have been disclosed for grouting joints and/or cracks in sewer conduits (see U.S. Pat. Nos. 4,312,605 and 4,318,835). These compositions require use of high levels of monomer to achieve good strength in the cured grout. Also an aqueous solution of a water soluble diacrylate ester of a polyoxyalkylene glycol monomer has been disclosed as a grout for stabilizing soil during tunneling or underground construction (see U.S. Pat. No. 4,295,762). However, this composition may lack sufficient stability when exposed to water for long periods of time, particularly where the water contains acidic or basic materials.

Perhaps the most successful commercially acceptable composition for sewer grouting is based upon acrylamide, typically in an aqueous solution, which is pumped with specially designed equipment into the site of the leak and into the surrounding soil to form a cured gel which inhibits or prevents leaking. In fact, much of the sewer sealing equipment employed in the United States and in other countries has been designed to utilize such acrylamide-type sealing compositions. Such compositions are desired, not only for their ability to appropriately seal leaks in sewers and in other areas, but also because of their viscosity range is easily adjustable, thus providing an easily pumpable mixture, their desirable cure rate and their physical properties achieved upon curing.

The cured acrylamide material generally has an acceptable compressive strength capable of withstanding the compressive forces encountered in sealing situations such as in sewers and when used to bind soil masses and an acceptable resistance to shrinking which is required for the cured material to function properly as a sealant as hydrological conditions vary at the sealing site. Additionally, the acrylamide type sealing compositions will cure in a reasonably brief period of time so that equipment may be advanced to new sealing locations. This is important when sealing sewer lines, for example, where a sewer packer is employed utilizing an inflatable sleeve which is required to be inflated within the sewer line being sealed until the curing of the sealant has been accomplished.

Acrylamide-type sealing compositions also cure to a somewhat weakly cohesive mass which permits easy removal of the application equipment, e.g., the sewer packer, so that the equipment may be moved to a new location without difficulty.

While the acrylamide-type sealing compositions have all these desirable properties and have proven to be extremely valuable in such applications, they have several serious defects including a serious toxicological problem which has limited their use. Acrylamide-type sealing compositions pose toxicological problems both to workers involved in the application of such compositions who may directly contact the acrylamide and to those later exposed to the liquids which pass through structures sealed with such compositions where unreacted acrylamide is present. That acrylamide is a neurotoxic material, and repeated exposure without normal handling precautions may lead to reversible disturbances of the central nervous system and that in at least one instance, acrylamide contamination of a well, resulting in mild acrylamide poisoning of well users, caused a ban on the use of the product in Japan is taught in Kirk-Othmer, Encyclopedia of Chemical Technology, John Wiley & Sons, Third Ed., Vol. 5, p. 371 (1979). This situation requires the replacement of the acrylamide-type sealants with a suitable substitute.

The acrylamide-type sealants also create quantities of steam on reacting at the location of the leak. The creation of steam at the location of the leak. The creation of steam at the location of the leak is very undesirable since the steam interferes with the use of remote viewing equipment such as a television camera.

SUMMARY OF THE INVENTION

It is highly desirable to replace the acrylamide-type grouting compositions with one having the same or similar desired physical properties, both in the liquid state and in the cured state, without the adverse toxicological problems associated therewith. The present invention not only accomplishes this result, but it provides a sewer grouting composition which can be applied using existing application equipment.

The present invention is a two-part composition which is cured at the site of application to provide a gel for inhibiting leakage in structures when cured. Unlike acrylamide-type sealants, the sealant of the present invention is relatively non-toxic when contacted orally, dermally, or by inhalation.

One part of the composition, hereinafter referred to as "Part A", comprises a first aqueous solution containing (i) about 10 to 50 weight percent of at least one hydrophilic, water soluble polyether prepolymer having a polyether backbone, which backbone preferably has a number average molecular weight of about 500 to 20,000, and terminal active olefinic groups, the olefinic groups being connected to the backbone by linking groups selected from —NH—, —CONH—, —OCONH—, and —NHCONH—, (ii) a chemically effective amount of at least one tertiary amine catalyst, and (iii) about 50 to 90 weight percent water. The term "terminal active olefinic groups" as used herein is meant to include compositions where the active olefinic groups are pendant from the polyether backbone as well as in terminal positions. The second part of the composition, hereinafter referred to as "Part B", comprises a second aqueous solution containing a chemically effective amount of at least one initiator.

The method of the present invention for sealing structures to inhibit leakage includes the steps of substantially simultaneously applying at the locus of the leakage Part A and Part B of the above-described composition and permitting these solutions to react.

The grouting composition of the present invention is useful for sealing water-bearing or water-holding structures such as sewer lines, aqueducts, tunnels, wells, settling ponds, and basements of buildings, as well as for soil stabilization of such structures as aqueducts, earthen dams, and dikes.

BRIEF DESCRIPTION OF DRAWINGS

Examples of known equipment suitable for practicing the method of this invention employing the composition of the present invention for grouting a joint in a concrete sewer line are illustrated in the accompanying drawings in which.

DETAILED DESCRIPTION OF THE INVENTION

Figure 1:
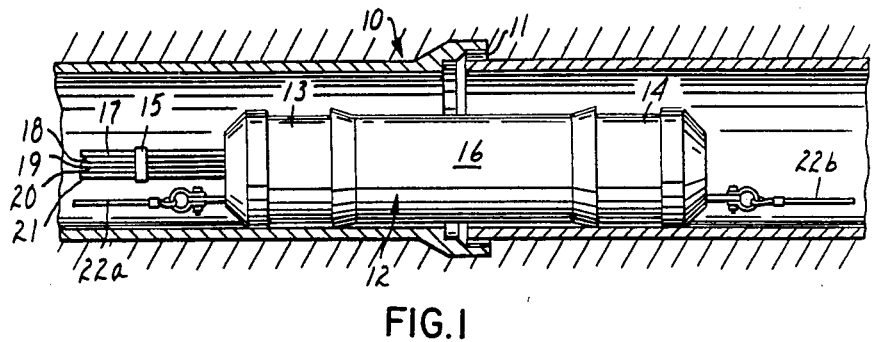
FIG. 1 is a view in elevation of a three element packer disposed in a sewer line (shown in cross-section) in the vicinity of a joint in the line.

Referring to the accompanying drawing and initially to FIG. 1, reference number 10 denotes generally a sewer line having joint 11 through which the incursion of water is occuring or may occur. Disposed within line 10 is packer 12 with three inflatable diaphragm sections 13, 14, and 16 which can be inflated by means of air, (shown in FIG. 1 in their collapsed conditions). Air used to inflate the packer diaphragm sections is delivered to the packer by means of hoses 17, 18, and 19, each hose serving to inflate one of the packer diaphragm sections. The aqueous prepolymer/catalyst solution (Part A) is delivered to the packer via hose 20 and the aqueous Peroxy initiator solution (Part B) via hose 21, all of the hoses being held together by band 15. Packer 12 can be positioned by means of cables 22a and 22b attached to the packer and to external means for moving the packer, e.g., winches.

Figure 2:
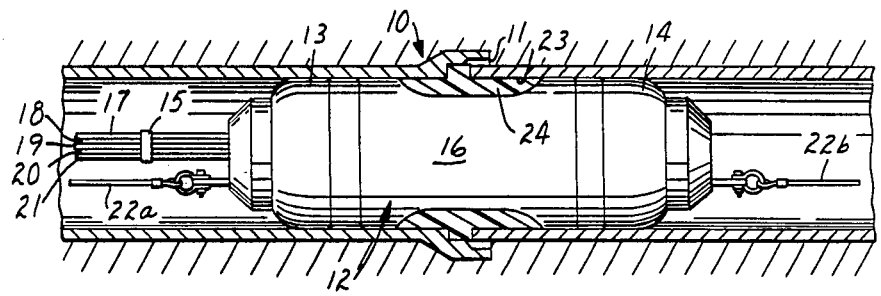
FIG. 2 is a view of the packer of FIG. 1 expanded at its ends to isolate the joint and form a circular cavity at the locus of the joint which is filled with the grouting composition.

In FIG. 2, outer diaphragm sections 13 and 14 of packer 12 have been inflated, isolating joint 11 and forming annular cavity 23 at the locus of the joint. Parts A and B of the composition are injected in controlled amounts into cavity 23, for example, by spraying separate streams of these materials into the cavity in such a manner as to cause the two sprays to impinge, thus ensuring rapid admixture and reaction.

Figure 3:
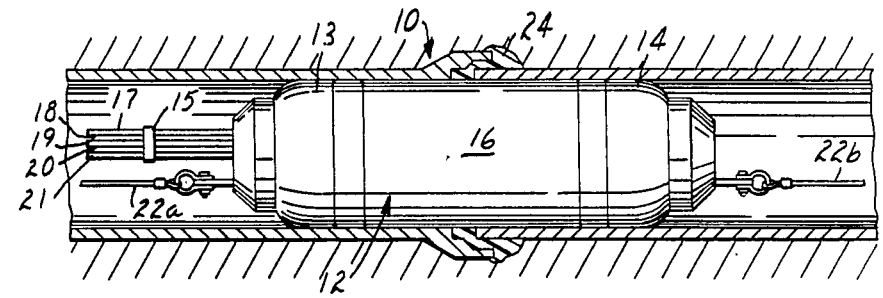
FIG. 3 is a view of the packer of FIG. 1 fully expanded to force the grouting composition from the cavity into the joint.

As Parts A and B are being injected and mixed in cavity 23, center section 16 of packer 12 is gradually inflated as shown in FIG. 3, forcing the reacting, gelling composition into joint 11. This concurrent injection of the grouting composition and inflation of section 16 provides positive placement of the grouting composition in the joint area and substantially prevents a large amount of gelled grouting composition from forming in annular cavity 23.

Figure 4:
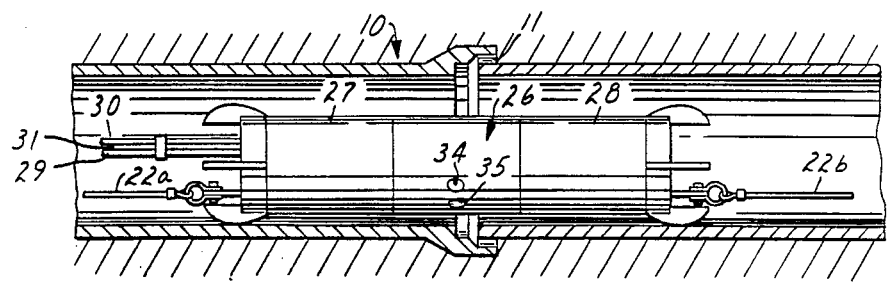
FIG. 4 is a view in elevation of a two element packer disposed in a sewer line (shown in cross-section) in the vicinity of a joint in the line.

Referring now to FIG. 4, sewer packer 26 is shown with two inflatable diaphragm sections 27 and 28 in their collapsed condition. These diaphragms may be inflated by means of air delivered to the packer by means of air hose 31. The aqueous prepolymer/catalyst solution (Part A) can be delivered by hose 30 and the aqueous peroxy initiator solution (Part B) can be delivered via hose 29. The packer may be positioned by means of cables 22a and 22b attached to the packer and to an external means for moving the packer, e.g., winches.

Figure 5:
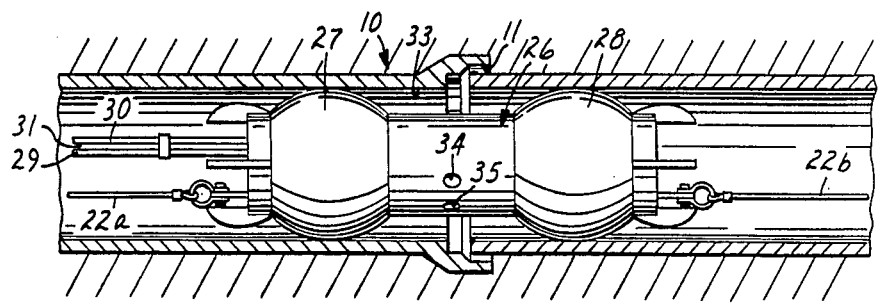
FIG. 5 is a view of the two element packer of FIG. 4 expanded at its ends to isolate the joint and form a circular cavity between the expanded packer surface and the inner sewer line surface.
Figure 6:
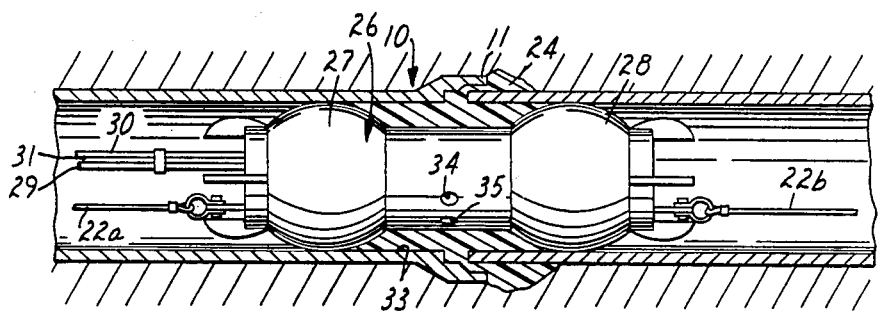
FIG. 6 is a view of the two element packer of FIG. 4 wherein the grouting composition has filled the cavity described in FIG. 5.

In FIG. 5, inflatable elements 27 and 28 of packer 26 have been inflated isolating joint 11 and forming annular cavity 33 at the locus of the joint between the packer wall and the inner wall of the sewer line. A controlled amount of the grouting composition is injected into cavity 33. Parts A and B of the grouting composition are introduced by pressure controlled flow through separate packer orifices 34 and 35, one orifice for Part A and the other orifice for Part B. When the streams commingle, a reaction occurs, forming the gel-forming grouting composition in the annular cavity as shown in FIG. 6.

Figure 7:
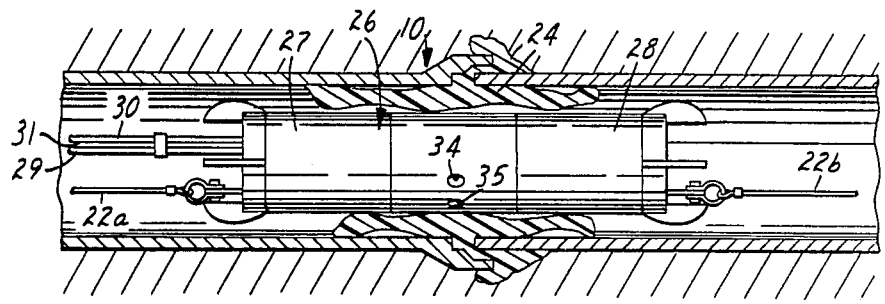
FIG. 7 is a view of the unexpanded packer of FIG. 4 after the grouting composition has been permitted to flow into the joint area and the surrounding soil.

In a short time after the injection, gel 24 begins to form in cavity 33 and is forced into joint 11 and into the surrounding soil. After the composition has gelled, packer 26 may be deflated as shown in FIG. 7, and moved by means of cables 22 to the next joint and the operation repeated.

Water-soluble, hydrophilic, olefinic-terminated polyether prepolymers useful in this invention may be expressed in terms of the general formula

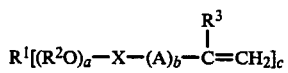
I where $R^1$ is an active hydrogen-free residue of a polyether polyol, e.g., ethylene glycol, glycerol, or 1,1,1-trimethylol propane; $(R^2O)_a$ is a hydrophilic poly(oxyalkylene) chain having a plurality of randomly distributed oxyethylene and higher oxyalkylene units, "a" being the number of oxyalkylene units in the poly(oxyalkylene) chain with this number being sufficient to impart water solubility and preferably non-crystallinity to the prepolymer wherein $R^2$ is a lower alkyl group having 2 to 4 carbon atoms; X is a moiety selected from —OCONH—, —NHCONH—, —NHCO— and —NH—; $R^3$ is hydrogen or a lower alkyl group having 1 to 4 carbon atoms, preferably hydrogen or a methyl group, A is a divalent aliphatic radical selected from —$R^4$— and

in which $R^4$ is an alkylene radical having 1 to about 6 carbon atoms, a 5- or 6-membered cycloalkylene radical having 5 to about 10 carbon atoms, or

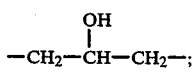

b is zero or 1; and "c" is an integer of from 2 to 6. Preferably A is a divalent carbonyloxyalkylene radical having 2 to 7 carbon atoms.

The polyether backbone preferably has a number average molecular weight of from about 500 to 20,000, more preferably 500 to 10,000, and random ethylene oxide groups and higher alkylene oxide groups sufficient ethylene oxide groups being present to provide hydrophilicity to the prepolymer. Generally, the ratio of ethylene oxide groups to higher alkylene oxide groups is in the range of about 1:1 to 4:1.

The olefinic termination of the polyether may be achieved by several methods, for example, by esterification of a polyether polyol or amidization of a polyether polyamine using a suitable olefinically unsaturated acid. Polyether polyols or polyether polyamines can be directly reacted with various olefins having ester, acid halide, glycidoxy, nitrile, isocyanate or silane functionalities.

A particularly useful method of forming the prepolymer is to react a polyether polyol with an ethylenically unsaturated isocyanate.

Commercially available polyether polyol precursors useful in making these water-soluble prepolymers are hydrophilic polyols, e.g., "Carbowax", available from Union Carbide Corp. The degree of overall hydrophilicity of the prepolymer can be modified by small amounts of poly(oxyethylene-oxypropylene) polyols sold under the trademark "Pluronic", by BASF Wyandotte Corp., such as Pluronic-L35, F38, and P46, or hydrophilic polyols with heteric oxyethylene-oxypropylene chain sold as "Polyol Functional Fluids" by Texaco Co., such as WL-580, WL-600, WL-1400, and WL-2800.

Preferred ethylenically-unsaturated isocyanates are compounds having the general formula:

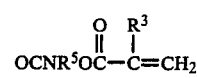
II wherein: $R^3$ as defined above in Formula I and $R^5$ is an alkylene radical having 1 to 6 carbon atoms.

Preferred ethylenically unsaturated isocyanates falling within Formula II are isocyanatoalkyl acrylates and methacrylates such as isocyanatomethyl acrylate, 2-isocyanatoethyl acrylate, 2-isocyanatoethyl methacrylate, 3-isocyanatopropyl acrylate, 3-isocyanatopropyl methacrylate, and 6-isocyanatohexyl acrylate, with 2-isocyanatoethyl methacrylate being most preferred. Other exemplary compounds falling within Formula II include ethylenically unsaturated isocyanate esters such as allyl isocyanate, methallyl isocyanate, and 4-ethenylcyclohexylisocyanate, but these are less preferred than isocyanatoalkyl acrylates and methacrylates as these compounds form prepolymers having slower curing rates than those formed from the isocyanate alkyl acrylates and methacrylates. The ethylenically unsaturated isocyanates of Formula II can be prepared using methods known to those skilled in the art of organic synthesis.

Another particularly useful method of forming the prepolymer is to react a hydroxy functional acrylate or methacrylate monomer with an isocyanate terminated polyether. Suitable isocyanate terminated polyethers are disclosed in U.S. Pat. Nos. 3,539,482, 3,985,688, 3,723,393, and 4,315,703, all of which are incorporated herein by reference. Suitable hydroxy functional acrylate and methacrylate monomers include 2-hydroxy propyl acrylate, 2-hydroxy propyl methacrylate, hydroxy ethyl acrylate, hydroxy ethyl methacrylate, 3-hydroxy propyl acrylate, and 3-hydroxy propyl methacrylate.

A further useful method for preparing the olefinic-terminated polyether prepolymer is to react a polyether polyamine with an ethylenically unsaturated acid such as acrylic acid or methacrylic acid. Examples of suitable polyether polyamines are "Jeffamines" available from Texaco Co.

A still further method for preparing the olefinic-terminated polyether prepolymer is to react a polyether polyamine, such as a "Jeffamine", with an ethylenically unsaturated isocyanate. Those previously described isocyanates of Formula II would also be suitable for reacting with the polyether polyamines.

Another method for preparing the olefinic-terminated polyether prepolymer is to react a polyether polyamine, such as a "Jeffamine", with ethylenically-unsaturated oxiranes, such as glycidyl acrylate, glycidyl methacrylate, and allyl glycidyl ether.

Generally, for whichever method is selected for preparing the olefinic-terminated polyether prepolymer, about 1.0 to 1.5 equivalents, preferably about 1.0 to 1.2 equivalents, of the terminating monomer, e.g., ethylenically-unsaturated isocyanates, hydroxy functional acrylates and methacrylates, ethylenically-unsaturated acids, and ethylenically-unsaturated oxiranes, are preferably used for each equivalent of the polyether polyol or polyether polyamine.

Where the prepolymer is to be stored prior to use, addition of a storage stabilizer is often desirable to prevent premature gelling. Suitable stabilizers include methyl ethyl hydroquinone, hydroquinone, and BHT.

Part A of the grouting composition also contains an effective amount of a water soluble tertiary amine catalyst, which upon mixing with Part B, containing an effective amount of a peroxy initiator, forms a redox curing system which effects the gelling of the composition. Particularly useful amine catalysts are water soluble tertiary amines such as trialkyamines, trialkanol amines and tertiary mixed alkylalkanolamines. Preferred examples of such amines are triethylamine, triisopropylamine, tributylamine, trihexylamine, tri-2-ethylhexylamine, tridodecylamine, methyldiethanolamine, dimethylethanolamine, 2-hydroxyethyldiisopropylamine, and triethanolamine, with triethanolamine being particularly preferred. Generally, Part A contains from about 0.5 to 10.0 parts tertiary amine catalyst for 100 parts prepolymer solution.

Part B of the grouting composition of this invention is an aqueous solution of a peroxy initiator. Particularly useful peroxy initiators are water soluble free radical initiators. The initiator concentration in Part B of the composition is selected to provide the desired concentration of initiator when Parts A and B are mixed. Suitable initiators include ammonium persulfate, sodium persulfate, potassium persulfate, sodium sulfite, ferrous sulfate, and t-butyl peroxide. Generally, Part B provides from about 0.5 to 10.0 parts peroxy initiator for 100 parts of Part A.

The prepolymers react in the presence of water, forming in situ a cross-linked, cured polymer gel. The mixing of the initiator solution and the prepolymer/catalyst solution initiates the reaction, the mixture initially remaining fluid with a viscosity of about 5 to 10 cps. In a very short period of time, e.g., from 5 to 200 seconds, the mixture cures to form a crosslinked gel. Depending upon the amount of fillers and other additives, the initial viscosity of the composition typically varies between 5 and 1,000 cps, the viscosity being higher at higher loadings of additives. Care should be taken to maintain the viscosity at a level which permits pumping the viscous mass, e.g., from a sewer packer into the leaking structure being sealed.

Although the grouting compositions of this invention, when reacted in water form a gel in a very short time, the time necessary to gel will vary depending on the ambient temperature, with a longer gel time usually being necessary in colder conditions. The gel time may be extended or shortened by varying the catalyst concentration.

The grouting compositions form gels which exhibit good compressive strength and shrink-resistance, maintaining a seal in a joint through cycles of expansion and contraction as well as cyclical changes from wet to dry conditions. The mixture of prepolymer, amine catalyst, peroxy initiator, and water reacts to produce a high compressive strength gel which will not shrink excessively and pull away from the sealed structure upon dehydration of the gel. The gel also has a substantial resistance to the chemical, physical, and biological activity of sewage.

It is preferred to include additional filler materials in the grouting composition to provide a more shrink-resistant, less compressible cured gel. For this purpose, any of a number of filler compositions have been found to be particularly effective. Useful fillers include water-insoluble particulate materials having a particle size less than about 500 microns, preferably 1 to 50 microns and a specific gravity in the range of about 0.1 to 4.0, preferably 1.0 to 3.0. Examples include diatomaceous earth, such as "Celite" products available from The Mansville Corp., fumed silicas such as "Cabosil" products available from Cabot Corp., and "Aerosil" products available from DeGussa Co., clays, calcium carbonate, talc, silica flour, and wood flour. The filler content of the cured grouting composition may be as much as 60 parts by weight filler per 100 parts by weight cured grouting composition, and preferably 5 parts to 20 parts by weight filler per 100 parts by weight.

Other additive ingredients may also be included. For example, latex reinforcing agents may be included to reduce shrinking and cracking of the scalant and to increase strength as disclosed in U.S. Pat. No. 4,315,703. Viscosity modifiers may be included to increase or decrease the viscosity, depending on the desired result, to make the composition more adaptable to particular sealing equipment. Additionally, fungicides may be added to prolong the life of the gel from to prevent attack by various fungi. Other active ingredients may be added for various purposes, such as substances to prevent encroachment of plant roots, and the like. Care should be exercised in choosing fillers and other additives to avoid any materials which will have a deleterious effect on the viscosity, reaction time, and stability of the gel being prepared.

The compositions described in the Examples were tested for shrinkage and compressive strength as follows:

VOLUME SHRINKAGE

Volume shrinkage was determined by measuring the percent volume reduction of molded rectangular (7.5 cm × 5 cm × 1.25 cm) test samples which had been permitted to dry in a forced air oven heated at 55° C. for one week. The percent shrinkage was the difference between the initial volume and the volume after drying divided by the initial volume times 100. Generally, compositions having shrinkage values less than about 25 percent are preferred. More particularly, the shrinkage value of the composition is desirably less than about 10 percent.

COMPRESSIVE STRENGTH

An 80 ml sample of grouting composition was mixed in a six ounce paper cup and allowed to gel. Two minutes after gellation, the grout was removed from the cup. A wooden load support (0.3 cm thick, 1.9 cm wide, 15 cm long) was placed across the sample. Using a Shore A-2 Penetrometer, the tester was allowed to contact the support using only the weight of the tester. This weight was recorded as the no load (NL) weight and provides an indication of the rigidity of the sample. The weight was then increased until the sample shattered or the load bottomed out. The maximum weight required to shatter the sample or bottom out the load was the load (L) weight.

The no load/load values provide a relative comparison of the strength of a gelled composition. (For example, a typical acrylamide-type composition provides a NL value of about 70 and an L value of about 80.) Generally, compositions having NL values of 75 to 80 and L values of 85 to 100 are preferred, although compositions having NL values as low as 40 may be suitable for some end uses.

EXAMPLE 1

Prepolymer A

To a flask fitted with a nitrogen inlet, stirrer, thermometer, and heating mantle were added 1650 parts "Thanol" 4072, a polyether polyol having a molecular weight in the range of about 4500–5000 available from Texaco Co., and 155 parts isocyanatoethyl methacrylate. The resulting mixture was heated to about 30° C. under a nitrogen purge and 0.90 part stannous octoate was added. The mixture was reacted at 70° C. for 4 hours until no isocyanate was detectible by infrared analysis and titration. The reaction mixture was cooled to 60° C. and 0.03 part hydroquinone methyl other was added. The nitrogen purge was discontinued and the resulting prepolymer was allowed to cool under ambient conditions. The prepolymer formed was a light-colored liquid material having a viscosity of about 3000 cps at 20° C.

EXAMPLE 2

Prepolymer B

To a flask fitted with a nitrogen inlet, stirrer, thermometer and heating mantle were added 1400 parts of an isocyanate-terminated prepolymer having an equivalent weight of 1400 g/eq. prepared according to Example No. 1 of U.S. Pat. No. 4,315,703 and 99 parts "Carbowax" 600. The mixture was heated to 30° C., 0.51 part stannous octoate was added and this mixture was heated to 75° C. and reacted for 2 hours. After cooling to 60° C., an additional 0.51 part stannous octoate and 130 parts 2-hydroxypropylacrylate were added, the temperature was raised to 70° C., and the resulting mixture reacted until no isocyanate was detectible by infrared analysis. The nitrogen purge was discontinued, the resulting prepolymer was allowed to cool under ambient conditions, and 407 parts water were added. The prepolymer solution formed was a clear liquid having 80 weight percent solids and a viscosity of about 1000 cps at 20° C..

EXAMPLE 3

Prepolymer C

To a flask fitted with nitrogen inlet, stirrer, heating mantle and water trap were added 450 parts "Jeffamine" ED-900, an amine-terminated polyether having a molecular weight of 900, available from Texaco Co., 75.6 parts acrylic acid, and 0.26 part t-butyl titanate. The temperature of the mixture was raised to 160° to 200° C. and toluene was added as needed to azeotrope off the water formed by the reacting materials. When the theoretical amount of water formed had been removed, the resulting prepolymer was allowed to cool. The prepolymer formed was a waxy solid.

EXAMPLE 4

Prepolymer D

In 62.2 parts deionized water were dissolved 220 parts "Jeffamine" ED 2000, an amine-terminated polyether having a molecular weight of 2000, available from Texaco Co. 32.6 Parts isocyanatoethyl methacrylate were slowly added to the polyether solution to avoid uncontrolled exotherm of the reaction. Upon completion of the addition of the isocyanatoethyl methacrylate, the materials were reacted at 50° C. for 2 hours. The resulting prepolymer was then cooled. The prepolymer formed was a clear solution having a viscosity of about 500 cps at 20° C..

EXAMPLE 5

Prepolymer E

To a flask fitted with nitrogen inlet, stirrer, and heating mantle were added 450 parts "Jeffamine" ED 900 and 148 parts deionized water. The temperature was raised to 30°–40° C. and 142 parts glycidyl methacrylate were added. The temperature was further raised to 50°–60° C. and the mixture was allowed to react for 5–6 hours. The mixture was cooled under ambient conditions. The resulting prepolymer was a clear liquid having a viscosity of about 8000 cps at 20° C..

EXAMPLES 6–17

In Examples 6–17 various grouting compositions were prepared. For Part A in each example, water, Prepolymer A, and triethanolamine catalyst were mixed in the amounts shown in Table 1. For Part B in each example, water, ammonium persulfate initiator, and "Celite", a diatomaceous earth, available from The Mansville Corp. were mixed in the amounts shown. Parts A and B of each example were then mixed and the gel time noted. The results are set forth in Table 1. The volume shrinkage for the gelled compositions was measured, the results being set forth in Table 1.

TABLE 1

| | Part A | | | Part B | | | | | |
|---|---|---|---|---|---|---|---|---|---|
| Ex. | Prepolymer A (Parts) | Triethanol Amine (Parts) | Water (Parts) | Ammonium Persulfate (Parts) | Celite (Parts) | Water (Parts) | Water Temperature (°C.) | Gel Time (Sec.) | Volume Shrinkage (%) |
| 6 | 10 | 2.5 | 40 | 2.5 | — | 40 | 20 | 10 | 30 |
| 7 | 10 | 2.5 | 40 | 2.5 | 4 | 40 | 20 | 10 | 15 |
| 8 | 10 | 2.5 | 40 | 2.5 | 8 | 40 | 20 | 10 | 5 |
| 9 | 12.5 | 2.5 | 40 | 2.5 | — | 40 | 20 | 9.0 | 22 |
| 10 | 12.5 | 2.5 | 40 | 2.5 | 4 | 40 | 20 | 9.5 | 8 |
| 11 | 12.5 | 2.5 | 40 | 2.5 | 8 | 40 | 20 | 10.0 | 5 |
| 12 | 10 | 3.0 | 40 | 3.0 | — | 40 | 5 | 25 | 28 |
| 13 | 10 | 3.0 | 40 | 3.0 | 4 | 40 | 5 | 22 | 15 |
| 14 | 10 | 3.0 | 40 | 3.0 | 8 | 40 | 5 | 21 | 5 |
| 15 | 12.5 | 3.0 | 40 | 3.0 | — | 40 | 5 | 17 | 22 |
| 16 | 12.5 | 3.0 | 40 | 3.0 | 4 | 40 | 5 | 18 | 8 |

TABLE 1-continued

| | Part A | | | Part B | | | | | |
|---|---|---|---|---|---|---|---|---|---|
| Ex. | Prepolymer A (Parts) | Triethanol Amine (Parts) | Water (Parts) | Ammonium Persulfate (Parts) | Celite (Parts) | Water (Parts) | Water Temperature (°C.) | Gel Time (Sec.) | Volume Shrinkage (%) |
| 17 | 12.5 | 3.0 | 40 | 3.0 | 8 | 40 | 5 | 18.5 | 5 |

EXAMPLES 18-23

In Examples 18-23, various grouting compositions were prepared. In each example, Part A of the composition was prepared by mixing Prepolymer A, water, and triethanolamine in the amounts shown in Table 2. Part B of each composition was prepared by mixing water and ammonium persulfate in the amounts indicated in Table 2. In each example, Parts A and B were mixed. The gel time and compressive strength of each composition were measured. The results are shown in Table 2.

TABLE 2

| | Part A | | | Part B | | | | Compressive Strength | |
|---|---|---|---|---|---|---|---|---|---|
| Ex. | Prepolymer A (Parts) | Water (Parts) | Triethanol Amine (Parts) | Ammonium Persulfate (Parts) | Water (Parts) | Water Temperature (°C.) | Gel Time (Sec.) | NL | L |
| 18 | 10.0 | 30 | 2.5 | 2.5 | 40 | 20 | 11 | 67 | 91 |
| 19 | 12.5 | 27.5 | 2.5 | 2.5 | 40 | 20 | 8.5 | 81 | 92 |
| 20 | 15.0 | 25.0 | 2.5 | 2.5 | 40 | 20 | 7.0 | 92 | 100 |
| 21 | 10.0 | 30 | 2.5 | 2.5 | 40 | 5 | 34.0 | 84 | 92 |
| 22 | 12.5 | 27.5 | 2.5 | 2.5 | 40 | 5 | 25.0 | 89 | 94 |
| 23 | 15.0 | 25 | 2.5 | 2.5 | 40 | 5 | 21.0 | 78 | 97 |

TABLE 3

| Example | Prepolymer | Latex Amount (g) | Gel Time (sec) | Compressive Strength NL | L | Volume Shrinkage (%) |
|---|---|---|---|---|---|---|
| 24 | F | 5 | 17 | 78 | 92 | 16.1 |
| 25 | G | 5 | 16 | 58 | 88 | 16.1 |
| 26 | F | 10 | 18 | 72 | 92 | 14.5 |
| 27 | G | 10 | 15 | 80 | 93 | 14.5 |

EXAMPLES 24-27

A prepolymer, designated Prepolymer F, was prepared as in Example 2 using 1510 parts of an isocyanate-terminated prepolymer having an equivalent weight of 1510 g/eg prepared according to the procedure of Example 1 of U.S. Pat. No. 4,315,703, 90 parts "Carbowax" 600, 130 parts hydroxypropyl acrylate, 1.2 part stannous octoate, and 452 parts deionized water. Another prepolymer, designated Prepolymer G, was prepared as was Prepolymer F, but the amount of hydroxypropyl acrylate was reduced to 117 parts. Grouting compositions were prepared with Part A of each composition containing 20 g prepolymer, 8 g 25% aqueous solution of triethanolamine catalyst, 12 g deionized water, and styrene/butadiene latex in the amount indicated in Table 3. Part B of each composition contained 8 g 25% aqueous solution of ammonium persulfate initiator in 32 g deionized water. Parts A and B of each example were mixed and the gel time was recorded. The samples were then tested for compressive strength and volume shrinkage. The results are set forth in Table 3.

EXAMPLE 28

A prepolymer was prepared as in Example 4, using 450 parts "Jeffamine" ED 900 and 156.5 parts isocyanatoethyl methacrylate. A sealant composition was prepared with Part A containing 20 g deionized water and Part B containing 2.5 g ammonium persulfate in 37.5 g deionized water. Parts A and B were mixed. Gel time was 25 sec and compressive strength was measured with NL being 80 and L being 85.

EXAMPLES 29-34

In Examples 29-34, various grouting compositions were prepared. In each example, Part A of the composition was prepared by mixing Prepolymer E and water in the amounts shown in Table 4 with 2.5 g triethanolamine and Part B was prepared by mixing 2.5 g ammonium persulfate with 40 g water. The temperature of the water used for making the compositions is given in Table 4. Parts A and B of each composition were mixed and the gel time recorded. The compressive strength of each composition was measured. The results are set forth in Table 4.

TABLE 4

| Example | Prepolymer E amount (g) | Water in Part A (g) | Water Temperature (°C.) | Gel Time (sec) | Compressive Strength NL | L |
|---|---|---|---|---|---|---|
| 29 | 10 | 30 | 20 | 20 | 40 | 74 |
| 30 | 12.5 | 27.5 | 20 | 13 | 64 | 70 |
| 31 | 15 | 25 | 20 | 10 | 90 | 100 |
| 32 | 10 | 30 | 5 | 37 | 60 | 60 |
| 33 | 12.5 | 27.5 | 5 | 26 | 82 | 92 |
| 34 | 15 | 25 | 5 | 23 | 79 | 87 |

EXAMPLE 35

Field trials were conducted on an 8" concrete sewer line in a city having a population of about 200,000 using a sealant composition of the formulation:

| Part A | Part B |
|---|---|
| 10 parts Prepolymer A | 8 parts ammonium persulfate, 25% aqueous solution |
| 8 parts triethanol amine, 25% aqueous solution | 42 parts water |
| 32 parts water | |

Parts A and B were mixed at a ratio of 1.5 to 1 and applied to sewer joints using a three element packer like that shown in FIGS. 1-3. Twenty sewer joints were sealed using about two gallons of sealant per joint. The gel time of the composition was about 20 seconds. The line was pressure tested after one day and after ten months. All joints were found to be satisfactorily sealed.

Various modifications and alterations of this invention will be apparent to those skilled in the art without departing from the scope and spirit of the invention and this invention should not be restricted to that set forth herein for illustrative purposes.

What is claimed is:

1. A two-part curable grouting composition for inhibiting leakage in structures when cured comprising:
   (A) a first aqueous solution comprising:
      (i) about 10 to 50 parts of at least one hydrophilic, water soluble prepolymer having a polyether backbone and terminal active olefinic groups, said olefinic groups being connected to said backbone by linking groups selected from —NH—, —CONH—, —OCONH— and —NHCONH—,
      (ii) a chemically effective amount of at least one tertiary amine catalyst, and
      (iii) about 50 to 90 parts water, and
   (B) a second aqueous solution comprising: a chemically effective amount of at least one water soluble peroxy initiator,
said composition being capable of forming a gel having a no load/load compressive strength of at least 40 and a volume shrinkage value of less than about 25 percent when said first aqueous solution and said second aqueous solution are mixed.

2. The composition of claim 1 wherein said polyether backbone has a number average molecular weight of from about 500 to 20,000.

3. The composition of claim 1 wherein said polyether backbone has a number average molecular weight of from about 500 to 10,000.

4. The composition of claim 1 wherein said polyether backbone has random ethylene oxide groups and higher alkylene oxide groups, the ratio of ethylene oxide groups to higher alkylene oxide groups being 1:1 to 4:1.

5. The composition of claim 1 wherein said active olefinic groups are selected from acrylate and methacrylate.

6. The composition of claim 1 wherein said prepolymer is the reaction product of a hydroxyl terminated polyether, an isocyanate material having at least two reactive isocyanate sites, and an active hydrogen-containing olefinic material.

7. The composition of claim 6 wherein said olefinic material is selected from hydroxyethyl acrylate or hydroxyethyl methacrylate or higher alkyl homologs thereof.

8. The composition of claim 1 wherein said prepolymer is the reaction product of a hydroxyl terminated polyether and an isocyanatoethyl methacrylate.

9. The composition of claim 1 wherein said prepolymer is the reaction product of a polyether polyamine and acrylic acid.

10. The composition of claim 1 wherein said prepolymer is the reaction product of a polyether polyamine and isocyanatoethyl methacrylate.

11. The composition of claim 1 wherein said prepolymer is the reaction product of a polyether polyamine and glycidyl methacrylate.

12. The composition of claim 1 wherein said prepolymer is compound having the general formula

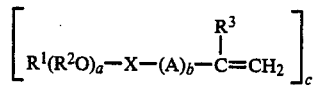

where $R^1$ is an active hydrogen-free residue of a polyether polyol, $(R^2O)_a$ is a hydrophilic poly(oxyalkylene) chain having a plurality of randomly distributed oxyethylene and higher oxyalkylene units, "a" being the number of oxyalkylene units in the poly(oxyalkylene) chain with this number being sufficient to impart water solubility to the prepolymer, X is a moiety selected from —OCONH—, —NHCONH—, —NHCO— and —NH—, $R^2$ is a lower alkyl group having 2 to 4 carbon atoms, $R^3$ is hydrogen or a lower alkyl group having 1 to 4 carbon atoms, A is a divalent aliphatic radical selected from —$R^4$— and

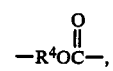

in which $R^4$ is an alkylene radical having 1 to 6 carbon atoms, a 5- or 6-membered cycloalkylene radical having 5 to about 10 carbon atoms, or a glycidyl radical, b is zero or 1, and "c" is an integer of from 2 to 6.

13. The composition of claim 11 wherein $R^3$ is hydrogen or a methyl group.

14. The composition of claim 11 wherein A is a divalent carbonyloxyalkylene radical having 2 to 7 carbon atoms.

15. The composition of claim 1 wherein said tertiary amine catalyst is triethanolamine.

16. The composition of claim 1 wherein said peroxy initiator is ammonium persulfate.

17. A method of sealing structures to inhibit leakage into or from said structure comprising:
   (A) substantially simultaneously applying at the locus of said leakage
      (i) an aqueous solution comprising:
         (a) at least one hydrophilic, water soluble prepolymer having a polyether backbone and terminal active olefinic groups, said olefinic groups being connected to said backbone by linking groups selected from —NH—, —CONH—, —OCONH—, and —NHCONH—, and
         (b) an effective amount of at least one tertiary amine catalyst, and
      (ii) an aqueous solution of an effective amount of at least one water soluble peroxy initiator, and (B) permitting solutions (i) and (ii) to react to form a gel having a no load/load compressive strength of at least 40 and a volume shrinkage value of less than about 25 percent.

18. A cured grouting composition comprising the polymerized product of at least one hydrophilic, water soluble prepolymer having a polyether backbone and terminal active olefinic groups, said olefinic groups being connected to said backbone by linking groups selected from —NH—, —CONH—, —OCONH—, and —NHCONH—, and water, the curing being effected by at least one tertiary amine catalyst and at least one water soluble peroxy initiator, said cured grouting composition being a gel having a no load/load compressive strength of at least 40 and a volume shrinkage value of less than about 25 percent.

19. A cured grouting composition used to seal structures to inhibit leakage into or from said structures prepared by the steps comprising:

(A) substantially simultaneously applying at the locus of said leakage
  (i) an aqueous solution comprising:
    (a) at least one hydrophilic, water soluble prepolymer having a polyether backbone and terminal active olefinic groups, said olefinic groups being connected to said backbone by linking groups selected from —NH—, —CONH—, —OCONH—, and —NHCONH—, and
    (b) an effective amount of at least one tertiary amine catalyst, and
  (ii) an aqueous solution of an effective amount of at least one water soluble peroxy initiator, and
(B) permitting solutions (i) and (ii) to react and cure to form a gel having a no load/load compressive strength of at least 40 and a volume shrinkage value of less than about 25 percent.

* * * * *

UNITED STATES PATENT AND TRADEMARK OFFICE
CERTIFICATE OF CORRECTION

PATENT NO.  : 4,749,592
DATED       : JUNE 7, 1988
INVENTOR(S) : ALTON J. GASPER and CHARLES D. WRIGHT It is certified that error appears in the above-identified patent and that said Letters Patent is hereby corrected as shown below:

Col. 8, line 24, "scalant" should be -- sealant -- .

Col. 9, line 22, "other" should be -- ether -- .

Signed and Sealed this

Sixth Day of June, 1989

Attest:

DONALD J. QUIGG

Attesting Officer

Commissioner of Patents and Trademarks